United States Patent [19] [11] 3,719,774
Kraaijenbrink [45] March 6, 1973

[54] VIDEO REPEATER FAULT ALARM SYSTEM

[75] Inventor: Hans Kraaijenbrink, Gouda, Netherlands

[73] Assignee: De Staat der Nederlanden, Ten Deze Verlegenwoordigd Door de Directeur-Generaal der Posterijen, Telegrafie en Telefonie, The Hague, Netherlands

[22] Filed: March 12, 1971

[21] Appl. No.: 123,657

[30] Foreign Application Priority Data

March 13, 1970 Netherlands ........................7003588

[52] U.S. Cl. ................178/6, 178/DIG. 4, 178/71 T, 179/175.31 R

[51] Int. Cl. ..............................................H04n 7/00

[58] Field of Search...178/6, 6.8, DIG. 4, 69 G, 71 T; 179/175.31 R

[56] References Cited

UNITED STATES PATENTS

| | | | |
|---|---|---|---|
| 3,557,323 | 1/1971 | Chalhoub | 179/175.31 R |
| 3,629,523 | 12/1971 | Chalhoub | 179/175.31 R |

*Primary Examiner*—Robert L. Richardson
*Attorney*—Brenner, O'Brien, & Guay

[57] ABSTRACT

A wideband transfer system comprises a transmitter, a receiver and a plurality of sections therebetween separated by repeaters, which sections are adapted to be selectively enabled by means applying a signal characteristic of a repeater to the input of this repeater.

Said means include a detector for each repeater, which detector determines the amplitude of line synchronization pulses of a video signal, automatically controls the application of the characteristic signal, which is a video signal composed of pulses for line synchronization only, and is adapted to actuate an alarm in the receiver.

The system is particularly suitable in the transfer of video signal across, for instance, a coaxial cable.

5 Claims, 5 Drawing Figures

T 5002

VIDEO REPEATER FAULT ALARM SYSTEM

The invention relates to a connection for transferring a wideband signal from a transmitter to a receiver, said connection comprising more than one section separated by repeaters and means for localizing the section most adjacent the transmitter across which a signal can reach the receiver, said means comprising devices for injecting a signal characteristic of a repeater into an input of this repeater.

A similar connection is known from Philips Telecomm. Rev. 23 (1962) 3, pages 110–112. In the absence of a signal at the incoming end of the receiver, in the known connection oscillators are activated in a specific number of repeaters from the station accommodating the receiver. These oscillators generate a sinusoidal signal having a frequency that is characteristic of the repeater.

It is a drawback of the known connection that a number of oscillators should be activated simultaneously and, consequently, it should be decided by means of a number of simultaneously occurring signals that differ only in frequency which section, across which a signal can reach the receiver, is most adjacent the transmitter.

It is an object of the invention to remove this drawback.

It is another object of the invention to avoid any backwardly operating signalling device for activating a signal generator in a repeater.

In accordance with the invention these objects are achieved by the fact that said means comprise a detector for each repeater, said detector being adapted to automatically control the injection of the characteristic signal and arranged to determine the amplitude of line synchronization pulses in a video signal, the signal to be injected being a video signal composed of pulses for line synchronization only.

In the following the invention will be elucidated by means of the description of an embodiment of a video line connection comprising means for backward error localization. In the description reference is made to the drawing, in which FIG. 1 schematically shows the video line connection;

Figure 1:
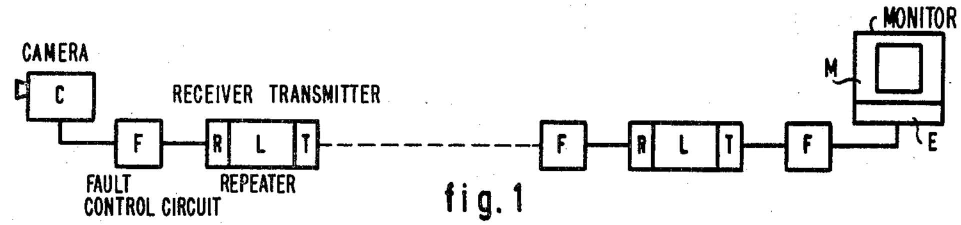

In FIG. 1 a camera C is connected to a monitor M by way of a video line connection. The video line connection comprises repeaters L each having a signal receiving portion R and a signal transmitting portion T. Fault control circuits F are included in the video line connected immediately before receiving portion R or immediately behind transmitting portion T for controlling the connection of a signal generator included in fault control circuit F to an input of receiving portion R output of transmitting portion or T. The only difference between the above alternatives is the combination of a fault control circuit line section with line repeater, which is guarded by fault control circuit F.

Figures 2, 4:
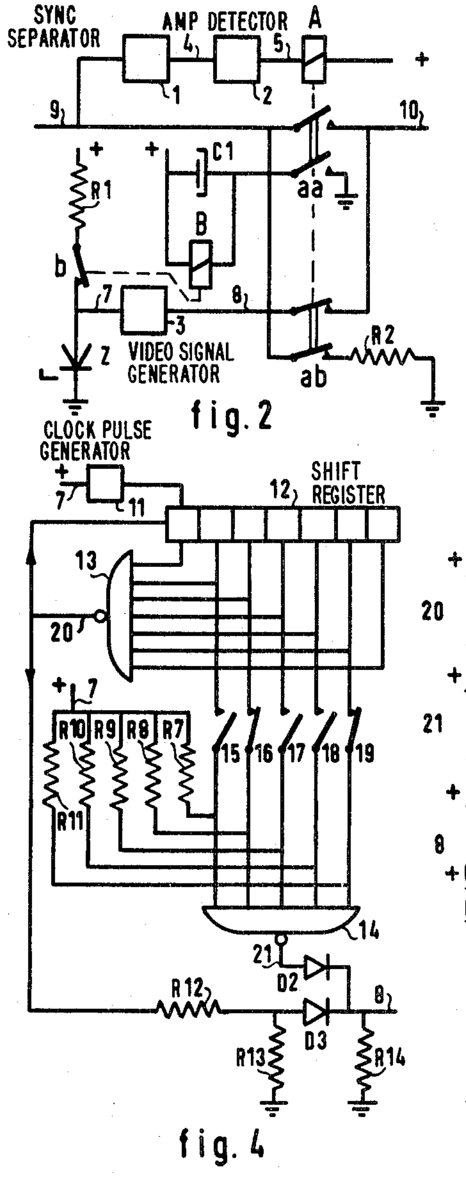
FIG. 2 shows the circuit for controlling the connection of a signal generator to a repeater.
FIG. 4 shows a video image generator 3 of FIG. 2.

FIG. 2 shows the fault control circuit F; a signal enters the circuit F via a video line section or from a repeater transmitting portion T via 9. A synchronization separating circuit 1 is adapted to derive the line synchronization pulses from the incoming signal, which pulses are considered according to amplitude in a detector 2. The detector determines the current through a winding of a relay A, which relay includes two bipolar contacts *aa* and *ab*.

Figure 3:
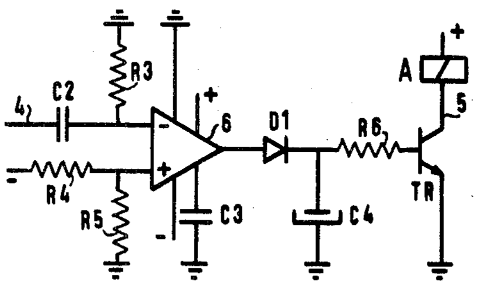
FIG. 3 shows the detector 2 of FIG. 2.

FIG. 2 shows the quiescent condition, in which an insufficient video signal is present at 9. In this condition the contact ab is closed and connects input 9 to ground by way of a termination resistor $R_2$, and connects an output 8 of a video signal generator 3 to an output 10 of circuit F. When the detector 2 detects sufficiently large line synchronization pulses in the video signal entering via input 9, contact aa is closed and contact ab is opened. Then input 9 is directly connected to output 10 and a winding of a relay B is energized, as a result of which a circuit, composed of a resistor R1 and a zener diode Z for the supply of the signal generator 3 from a voltage source, is deactivated by opening of a switch b in response to energization of relay B. In this condition the output 8 of the video signal generator 3 is not connected to output 10. A capacitor C1 smoothes out voltage pulses across the winding of relay B. As shown in FIG. 3, the detector is a differential amplifier, in which the signal applied through an input 4, via a capacitor C2 and past a parallel resistor R3, to the differential amplifier 6 is deducted from a constant potential obtained by a voltage division between the resistors R4 and R5. The output signal of the amplifier 6 across a capacitor C3 is rectified by a diode D1 and is applied past a parallel capacitor C4 and via a resistor R6 to the base of a transistor TR, which transistor is adapted to switch a current path via an output 5 and the winding of relay A.

FIG. 4 shows a video signal generator adapted to be energized via terminals 7 and comprising a clock pulse generator 11, a shift register 12, NAND-gates 13 and 14 and five detachable connections 15, 16 17, 18 and 19. The clock pulse generator drives the shift register 12, in which, due to the fact that the first seven sections are fed back across the NAND-gate 13, in a sequence of eight steps a "0" is shifted through the register. In dependence upon the condition of the detachable connections 15, 16, 17, 18 and 19, a signal condition at an output 21 of the NAND-gate 14 is applied to an output 8 via a diode D2, while a signal condition at an output 20 of the NAND-gate 13 is passed across a voltage divider formed by resistors R12 and R13 and via a diode D3 to the output 8. The output 8 is grounded by way of a high ohmic resistor R14. The inputs of the NAND-gate 14 corresponding with the connections 15, 16, 17, 18 and 19 are connected to a positive voltage source via the high ohmic resistors R7, R8, R9, R10 and R11, respectively, by means of the input 7.

Figure 5:
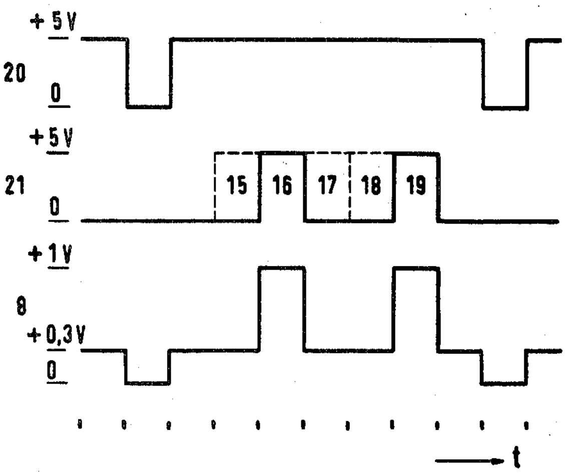
FIG. 5 shows a time sequence diagram of the signals produced in the video image generator.

FIG. 5 shows a time sequence diagram of the signal condition during well over one sequence 8 steps at the points 20, 21 and 8 in the diagram shown in FIG. 4.

The shifting of a "0" through the shift register produces at point 20 a change to 0V from the state +5V during one of eight successive clock pulse cycles. Since, as shown in FIG. 4, connections 16 and 19 are closed, the voltage pattern shown appears at point 21.

By voltage division and summation the lowermost voltage pattern is obtained at the output 8. This voltage pattern can be reproduced on a monitor. Thirty one patterns differing from the state 00000 can be produced. The feature of automatically establishing the surveyance of an incoming signal has particular significance in the transfer of video signals, since this transfer is preferably used in connections in which a backwardly directed signalling channel is hard to realise. An example thereof is a coaxial cable connection. By arranging the detector in the control circuit F for detecting only line synchronization pulses it is achieved that an image monitor in the receiver can be actuated by an alarm, which alarm E functions with a detector for determining the amplitude of vertical synchronization pulses.

I claim:

1. In a system for transmitting wide-band signals, such as video signals including line and vertical synchronization pulses, over long distances between a transmitter and a receiver and which system includes a plurality of sections each separated by a repeater, a device for indicating the location of transmission errors in said system, said device comprising;

signal generator means at each said repeater adapted to generate a signal uniquely representative of each said repeater, and detector means at each said repeater adapted to enable said signal generator in response to an incoming signal below tolerance levels, whereby said signal generator means produces a signal uniquely representative of said repeater to indicate the location of the error.

2. A device according to claim 1 wherein said receiver comprises alarm means, and detector means responsive to signals from said signal generator means and adapted to actuate said alarm means.

3. A device according to claim 1 wherein said detector means comprises a differential amplifier.

4. A device according to claim 1 wherein said signal generator means comprises clockpulse generating means, shift register means, first NAND-gate means connected between outputs and an input of said shift register means, switch means connected to outputs of said shift register means, second NAND-gate means connected to said switch means and an output, whereby selective closure of said switch means provides a distinctive signal output for said signal generator means.

5. A device according to claim 1 wherein said detector means detects insufficient amplitude of line synchronization pulses, and said signal generator means produces a signal having no vertical synchronization pulses.

* * * * *